US010295850B1

(12) United States Patent
Xin et al.

(10) Patent No.: US 10,295,850 B1
(45) Date of Patent: May 21, 2019

(54) ELECTRICALLY TUNABLE POLARIZATION INDEPENDENT LIQUID CRYSTAL MICRO-LENS ARRAY COMPRISING TOP AND BOTTOM LIQUID CRYSTAL LAYERS

(71) Applicant: Black Sesame International Holding Limited, Santa Clara, CA (US)

(72) Inventors: Zhaowei Xin, Wuhan (CN); Dong Wei, Wuhan (CN)

(73) Assignee: Black Sesame International Holdings Limited, Santa Clara, CA (US)

( * ) Notice: Subject to any disclaimer, the term of this patent is extended or adjusted under 35 U.S.C. 154(b) by 0 days.

(21) Appl. No.: 16/010,135

(22) Filed: Jun. 15, 2018

Related U.S. Application Data (60) Provisional application No. 62/585,290, filed on Nov. 13, 2017.

(51) Int. Cl.
*F21V 8/00* (2006.01)
*G02F 1/11* (2006.01)
*G02F 1/29* (2006.01)

(52) U.S. Cl.
CPC ............ *G02F 1/116* (2013.01); *G02B 6/0056* (2013.01); *G02F 1/29* (2013.01); *G02F 2201/122* (2013.01); *G02F 2201/16* (2013.01); *G02F 2203/06* (2013.01)

(58) Field of Classification Search
CPC ........... G02F 2201/122; G02F 2201/16; G02F 2203/06; G02F 1/116; G02F 1/125
See application file for complete search history.

(56) References Cited

U.S. PATENT DOCUMENTS

| 7,079,203 | B1* | 7/2006 | Huang | ................. G02F 1/1334 349/200 |
| 8,570,460 | B2* | 10/2013 | Gu | ...................... C09K 19/544 349/86 |
| 2007/0183020 | A1* | 8/2007 | Hikmet | .............. G02F 1/13718 359/279 |
| 2016/0011429 | A1* | 1/2016 | Vdovin | ............ G02F 1/133526 359/462 |

* cited by examiner

*Primary Examiner* — Paul C Lee
(74) *Attorney, Agent, or Firm* — Timothy T. Wang; Ni, Wang & Massand, PLLC (57) ABSTRACT

A polarization-independent liquid crystal micro-lens array, comprising, an optically transparent, dielectric planar panel, an optically transparent upper planar electrode deposited upon the planar panel top surface and bottom surface, a top substrate positioned adjacent to the planar panel top surface, a top pattern electrode deposited on the top substrate internal surface, a top liquid crystal layer disposed between the planar panel top surface and the top substrate internal surface, the top liquid crystal layer having a first polarization, a bottom substrate positioned adjacent to the planar panel bottom surface, a bottom pattern electrode deposited on the bottom substrate internal surface, a bottom liquid crystal layer disposed between the planar panel bottom surface and the bottom substrate internal surface, the bottom liquid crystal layer having a second polarization orthogonal to the first polarization.

20 Claims, 5 Drawing Sheets

ELECTRICALLY TUNABLE POLARIZATION INDEPENDENT LIQUID CRYSTAL MICRO-LENS ARRAY COMPRISING TOP AND BOTTOM LIQUID CRYSTAL LAYERS

BACKGROUND

(1) Technical Field

The instant disclosure pertains to a micro-lens, in particular a polarization independent liquid crystal micro-lens array.

(2) Background

The field of liquid-crystal (LC) device that has been explored for various optical systems. The uniaxial birefringence property of nematic liquid crystal (NLC) is one of its fundamental properties. In an LC device phase distribution is controlled. The phase distribution is determined by the reorientation of LC molecules under an external electric or magnetic field. The LC device is polarization dependent on the incident light due to the intrinsic uniaxial anisotropy. The utilization efficiency of incident beams is degenerated by this property, particularly in the area of liquid crystal micro-lens array (LCMLA). The incident beams with electric vector vibrating perpendicular to the optical axis of LCMLA will pass through the LC cell without converging. These beams are filtered out by the optical system. Hence, a polarizer is mounted in front of the LCMLA to remove these beams and improve the performance of LC devices, this approach limits the optical efficiency.

A polarization independent LCMLA may lead to improving performance of optical systems. In order to eliminate the polarization dependence on incident beams, prior systems have proposed an LCMLA based on blue phase liquid crystal (BPLC) and polymer dispersed liquid crystal (PDLC). By changing the LC material, drawbacks are created, such as a narrow operation temperature range of BPLC and very high control voltages. To reduce the driving voltage and expand the range of temperature, methods were tried to arrange LC molecules with axially symmetric alignment. One drawback of this approach was that the fabrication is complex and an precise alignment.

Depending on fabrication approaches, polarization-insensitive LCMLAs may be divided into two categories: the devices based on LC materials such as blue phase liquid crystal (BPLC) or polymer dispersed liquid crystal (PDLC), and the others based on the pre-alignment of common LC molecules.

The improvement provided by these micro-lens arrays is based on the fact that BPLC incident beams may be focused due to the isotropic property of LC materials. Although these methods demonstrate no polarization dependence, they have obvious drawbacks such as narrow temperature range of the BPLC and very high signal voltage. Ren et al demonstrated a polarizer-free micro-lens array using PDLC materials as an electro-optic medium. The tunable focal length of this kind of device may be adjusted in a high voltage regime.

Fuh built a polarization independent LC lens by combining radially or azimuthally aligned LC films with gradient alignment using photo-alignment. One problem with this approach is that photo-alignment is unstable at high temperature and under UV beam illumination, and thus this approach is not suitable for micro-lens array due to the complexity of the build.

LC Fresnel lenses with orthogonal binary configurations have also been fabricated with polarization independence. The obvious drawback of this approach is that both sides of the substrate require an extremely precise alignment on the orientation layer.

Previous LC devices have either been polarization-sensitive and thus demonstrate relatively low beam utilization efficiency, and polarization insensitive designs have either a high working voltage, complex build or have a limited operational temperature. What is sought is a device capable of polarization-independent LCMLAs (PI-LCMLAs) for improving imaging micro-devices and micro-systems that overcomes these limitations.

SUMMARY OF THE INVENTION

In one embodiment a polarization-independent liquid crystal micro-lens array, comprising, an optically transparent, dielectric planar panel, the planar panel having a top surface and a bottom surface, an optically transparent upper planar electrode deposited upon the planar panel top surface, an optically transparent lower planar electrode deposited upon the planar panel bottom surface, a top substrate having a top substrate external surface and a top substrate internal surface, the top substrate positioned adjacent to the planar panel top surface, a top pattern electrode deposited on the top substrate internal surface, wherein the top pattern electrode is patterned with an array of micro-holes, a top spacer disposed between the planar panel top surface and the top substrate internal surface, a top liquid crystal layer disposed between the planar panel top surface and the top substrate internal surface, the top liquid crystal layer having a first polarization, a bottom substrate having a bottom substrate external surface and a bottom substrate internal surface, the bottom substrate positioned adjacent to the planar panel bottom surface, a bottom pattern electrode deposited on the bottom substrate internal surface, wherein the bottom pattern electrode is patterned with another array of micro-holes, a bottom spacer disposed between the planar panel bottom surface and the bottom substrate internal surface and a bottom liquid crystal layer disposed between the planar panel bottom surface and the bottom substrate internal surface, the bottom liquid crystal layer having a second polarization orthogonal to the first polarization.

In a further embodiment a polarization-independent liquid crystal micro-lens array optical system, comprising, a liquid crystal micro-lens, having, an optically transparent, dielectric planar panel, the planar panel having a top surface and a bottom surface, an optically transparent upper electrode deposited upon the planar panel top surface, an optically transparent lower planar electrode deposited upon the planar panel bottom surface, a top substrate having a top substrate external surface and a top substrate internal surface, the top substrate positioned adjacent to the planar panel top surface, a top pattern electrode deposited on the top substrate internal surface, wherein the top pattern electrode is patterned with an array of micro-holes, a top spacer disposed between the planar panel top surface and the top substrate internal surface, a top liquid crystal layer disposed between the planar panel top surface and the top substrate internal surface, the top liquid crystal layer having a first polarization, a bottom substrate having a bottom substrate external surface and a bottom substrate internal surface, the bottom substrate positioned adjacent to the planar panel bottom surface, a bottom pattern electrode deposited on the bottom substrate internal surface, wherein the bottom pattern electrode is patterned with another array of micro-holes, a bottom spacer disposed between the planar panel bottom surface and the bottom substrate internal surface and a bottom liquid crystal layer disposed between the planar panel bottom surface and the bottom substrate internal surface, the bottom liquid crystal layer having a second polarization orthogonal to the first polarization, a top voltage driver electrically connected to the upper electrode and the top pattern electrode and a bottom voltage driver electrically connected to the lower planar electrode and the bottom pattern electrode, wherein the bottom voltage driver and top voltage driver are simultaneously actuated to permit transit of unpolarized light through the liquid crystal micro-lens.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION OF THE INVENTION

Liquid crystal micro-lens arrays (LCMLAs) are suitable for various micro-optical architectures, such as optical switches, optical communication, plenoptic cameras, and wavefront detectors. The electrically tunable focal length, which may be used to replace fixed focal length lenses, is one of their fundamental properties. This property may be attributed to the reorientation of liquid crystal (LC) molecules under an external electric-field or a magnetic-field for forming a gradient refractive index distribution. LCMLAs fabricated according to photolithography are polarized and thus dependent on the electric-field vector of incident beams due to the intrinsic uniaxial anisotropy of LC molecules. Thus, the incident beams with electric-field vector perpendicular to the optical axis of the LCMLA will pass through LC film without beam convergence. These beams are filtered out for adaptive optical set-ups or micro-systems.

Hence, a polarizer may be mounted in front of the LCMLA to choose suitably polarized beams and consequently improve the performances of the LC device. This approach limits the utilization efficiency of incident beams. Therefore, how to achieve polarization-independent LCM-LAs (PI-LCMLAs) for improving the performances of imaging micro-devices or micro-systems is sought. In this disclosure, a polarization-independent micro-lens array using double layered nematic liquid crystals (NLC) with orthogonal alignment is disclosed. Two orthogonal LC layers are separated by double-sided indium-tin oxide silica. Further optical experiments and investigations reveals that the PILCMLA may work in polarization and polarization-insensitive mode by modulating the driving voltages. The normalized focusing intensity has no polarization dependence on the incident light. With advantages in high optical efficiency, simple manufacture, electrically tunable focal length, low power consumption, polarization independence and multi operation modes, the disclosed device may be used for has many potential applications in imaging and optical systems.

The microstructure of the PI-LCMLA presented in this disclosure has orthogonal optical axes of two LC films or cells. The cascaded microstructure provides a wide operation range in the manipulation of incident beams and also merges multiple operation modes for imaging applications, such as planar imaging with adaptive beam adjustment, polarization imaging mode, and polarization-independent imaging mode.

Generally, the polarization imaging mode may also be divided into o-mode and e-mode, when a voltage signal may be applied over one LC cell in a cascaded LC microstructure. If a voltage signal may be applied over the top LC layer, partial linearly polarized light which is parallel to the optical axis of the top LC layer is converged, this is a case of e-mode. Also, o-mode means that partial incident beams with electric-field vector perpendicular to the rubbing direction of the top LC layer may be focused by the bottom LC layer with a suitable voltage signal Vrms applied. In each polarization imaging mode, the focal length of the imaging microsystem with LC microstructure may be adjusted through changing the root mean square (rms) value of the signal voltage applied, which means that the targets at different distance may be easily captured via tuning the signal voltage without mechanical movement. Based on the intrinsic uniaxial anisotropy of LC materials and the fixed gap between both LC cells according to the architecture constructed, the imaging operation may be regarded as two independent process relied on different light path, when the device working in the polarization imaging mode. So, the focusing range of both light paths is independent but sometimes presents some region overlapping.

The depth of field (DOF) of the present imaging set-up may be further extended through adjusting both signal voltages applied over cascaded LC microstructure. The PI-LCMLA may also work in the polarization-insensitive mode. When two driving voltage signals are applied over two LC cells, simultaneously, incident beams are collected fully to image and thus present an optical efficiency improved greatly. When the voltage signals applied over the LC devices are removed, the PI-LCMLA becomes a polarization-insensitive phase modulator and the intensity images may be acquired easily.

In this disclosure, a high beam utilization efficiency and multi-functional imaging ability based on the PI-LCMLA constructed by double-layered LC materials with orthogonal alignment are demonstrated. The devices are fabricated effectively according to UV-photolithography, wet etching, and coupling process of two LC layers with orthogonal orientation separated by a double-sided ITO silica. The light utilization efficiency is improved, which reaches almost two times that of LCMLA, and consequently presents a tunable compound focusing. It may be expected that this kind of LCMLA will play a role in many potential applications because they can provide a choice of performing polarization imaging or 9 polarization-independent imaging based on two independent driving operations of a cascaded LC microstructure.

LC is a class of substance that may be an intermediate state between solid and liquid. Generally, nematic liquid crystal (NLC) is a type of uniaxial birefringent crystal and presents two principle refractive indices. Usually, LC molecules may be reoriented along the electric field stimulated in the LC layer. The effective refractive index for the beams of incident light may be easily adjusted through applying a relatively low signal voltage, but that for the ordinary beams remains constant. Hence, the intrinsic uniaxial anisotropy of LC materials demonstrates a polarization dependence on incident light. In this disclosure, a PI-LCMLA with two orthogonal LC layers increases the light utilization efficiency compared to that of common polarization LCMLA, and therefore realizing a switched imaging operation between the polarization mode and the polarization-independent mode.

The working principle of the PI-LCMLA coupled with a sensor array, the LC molecules in the top and bottom LC layer are firstly oriented according to the rubbing direction of PI alignment layers fabricated over the surfaces of the electrodes, as labeled by x- and y-axis of the coordinate system. Without external voltage signal or the rms value of the applied signal voltage being less than a specific threshold, it acts as a polarization-independent phase modulator with a fixed phase shift corresponding to incident light with two orthogonal components of Ex and Ey and directly passing through each circular aperture couple of the LC cells.

Through driving action of the spatial electric-field stimulated in LC layer, LC molecules are then rearranged along the electric-field direction so as to present a gradient refractive index distribution. Once one LC cell is loaded by a suitable signal voltage, it will work in a converging state, and another IC cell, without any signal voltage or the rms voltage being less than the threshold of the LC microstructure, will take effect as a polarization-dependent phase retarder. The polarization beams propagate along the initial moving direction. One LC cell may be used to focus one polarization component parallel to x(y)-axis for shaping an arrayed focus distribution. Another polarization component perpendicular to x(y)-axis moves along the initial direction and covers the aperture region.

When two voltage signals with matched voltage value are applied over both LC cells, simultaneously. The difference of driving voltages applied on the top and bottom LC layer is caused by the thickness of ITO substrate sandwiched between two patterned aluminum substrates. Incident beams with arbitrary electric-field vector, which may be decomposed according to the coordinate system focused at the same point so as to shape a compound focus array over the focal plane of the PI-LCMLA. Because incident light may in principle be decomposed into two parts with orthogonal electric-field vector according to the orthogonal rubbing of PI alignment layers, those beams with the same electric-field direction corresponding to x- or y-axis may be focused onto the same point by independently adjusting the rms values of the voltage signals applied over both LC cells, which means that a compound focusing or a polarization-independent beam focusing may be achieved by the LCMLA constructed.

Fabrication:

(a) Firstly, a photoresist is spin-coated onto the surface of two aluminum-deposited silica substrates at 2000 rpm for 10 s and further 4000 rpm for 60 s, respectively. A UV-photolithography process is carried out to develop the photoresist mask. During chemical etching, partial aluminum microstructures over the surface of the silica substrates, which are exposed directly to chemical solvent are etched away and leaving micro-hole-patterned electrodes.

(b) To eliminate organic contaminants, the two patterned aluminum silica substrates and a double-sided ITO silica substrate, are cleaned thoroughly for 5 min by acetone, alcohol and deionized water, respectively.

(c) A layer of PI alignment film with a thickness of ~1 μm is coated over the surface of the micro-hole-patterned electrodes and also both sides of the double-sided ITO electrode. Silica substrates above are baked at 230° C. for 30 min to strengthen the binding of the PI layer and the surface of the electrodes.

(d) PI layers are rubbed to shape anchoring trenches with a mean width of ~750 nm and depth of ~50 nm.

(e) The top substrate with the top pattern electrode and the planar panel with the ITO films, are sealed face to face to maintain an interval of ~20 μm using 20 μm diameter glass microsphere spacers, so as to lead to an initial or top micro-cavity. The LC anchoring directions in the micro-cavities are orthogonal.

(f) The back side of the planar panel is coupled face to face with the bottom micro-hole-patterned electrode so as to form the bottom micro-cavity with the same depth of ~20 μm. Keeping in mind that the initial LC anchoring direction of the micro-cavities are also orthogonal but perpendicular to that of the top micro-cavity. Micro-hole-patterned electrodes used in the top and bottom micro-cavities have central symmetry via the alignment marks using lithography equipment.

The focal length of the PI-LCMLA may be flexibly adjusted through varying the tilting angle of LC molecules in the spatial electric-field stimulated, which corresponds to a variance of the spatial distribution of the equivalent refractive index of LC materials sealed in both the top and bottom micro-cavities.

An arrayed gradient refractive index arrangement exists in the disclosed LC layer arrangement, which corresponds to an arrayed LC micro-lens formed so as to discretely converge incident beams. In the nematic LC layer sandwiched by two relatively large electrodes with a spacing of ~20 μm, nematic LC molecules are firstly aligned layer by layer according to initial alignment trenches fabricated over the surfaces of both electrodes.

Incident beams with arbitrary polarization state may be decomposed into two basic linearly polarized components and respectively converged by layered LC cell with orthogonal LC alignment. For promoting beam utilization efficiency, two way voltage signals may be applied over the top and bottom LC cell of the LC device, simultaneously, and then the voltage value is adjusted finely so as to collect as many incident beams as possible. The e-beams of incident light are firstly converged by the top LC cell and simultaneously the o-beams passing through the cell, and then transformed into e-beams corresponding to the bottom LC cell so as to be efficiently converged. But the converged e-beams processed by the top LC cell are transformed into o-beams so as to present a total beam utilizing efficiency of more than a value of 90%. When the signal voltage loaded over the top LC cell reaches ~5.5 Vrms, e-beams of incident light is focused sufficiently and then the normalized focusing increases. Through adjusting another signal voltage loaded over the bottom LC cell and at ~2.8 Vrms, the remainder light or o-beams are then focused by the LC cell so as to result in a normalized intensity of 100%. So, the results indicate that incident beams can theoretically be converged by the PI-LCMLA.

When a signal voltage of more than ~10.0 Vrms is loaded over the top LC cell of the PI-LCMLA, a similar circular beam spot with an almost unvaried size will appear in a relatively wide voltage region of more than ~4.0 Vrms, but a similar effect is not be observed if a similar signal voltage is loaded over the bottom LC cell of the same device. The effect may be attributed to Fraunhofer diffraction by an arrayed micro-circular aperture shaped over the patterned electrode of the bottom LC cell. When the signal voltage applied over the top LC cell is above the threshold, the directors of internal LC molecules (located distant from the initial orientation trenches of PI layers) of the top LC cell will be aligned along the strong spatial electric-field stimulated and then almost perpendicular to the inner surfaces of the electrodes. Therefore, no focusing may be performed through the top LC cell. After passing through the bottom LC cell, where the LC molecules are parallel to the rubbing direction of PI layers due to a strong anchoring based on shaped trenches in PI layers of the bottom LC cell. Thus, the arrayed micro-hole shaped in one electrode of the bottom LC cell act as a micro-circle-patterned plate to generate far-field diffraction.

Diffraction represents the ultimate limit on image quality. When two point sources of equal irradiance are incoherent, the image of point sources formed by the imaging system will be composed of a distribution of partially overlapping Airy patterns. According to the Rayleighs criterion, two adjacent Airy disks may be separated when the center of one Airy disk falls on the first minimum of the Airy pattern of the other one.

Depending on the basic principle of Fraunhofer diffraction, an objective lens may be used to shorten the imaging light path and then a CCD camera may be located at the focal plane acting as a viewing screen. A beam of horizontal polarized light passes firstly through the top LC cell applied by a relatively high signal voltage such as ~14.0 Vrms, and then enters the bottom LC cell of the PI-LCMLA, and finally exits from the micro-hole-patterned electrode without any signal voltage. According to Fraunhofer diffraction theory, the diffractive beams out from the diffractive screen are distributed uniformly by micro-holes interact each other and then form similar far-field diffractive spot patterns over the focal plane of the lens, which may also be captured by the CCD camera located at the focal plane of the lens.

Based on the intrinsic anisotropy of LC materials, the incident light with an electric-field vector parallel to the optical axis may be focused effectively and then the remainder beams directly propagate through the functioned LC structure without any beam converging in LCMLAs. The residual light may be filtered out for optical imaging because they will not influence the beam processing efficiency but also result in extra noise that reduces the signal-to-noise ratio. Generally, a polarizer is placed in front of the LC devices. Beam utilization efficiency is limited due to a fact that partial incident beams having the same polarization orientation with the polarizer may be selected to pass through the polarizer inserted into the measurement light path. To prompt light utilization efficiency, a PI-LCMLA constructed by stacking two LC micro-lenses or cells with orthogonal polarization orientation may be used so as to simultaneously employ the e-beams and o-beams of incident light, and therefore highlight a way to increase or adjust the beam utilization efficiency.

The thickness of the double-sided ITO silica substrate in the PI-LCMLA may have an impact on the image quality in the polarization-independent mode. If the double-sided ITO silica is thin enough relative to the focal lengths of both LC cells, both the horizontal and vertical polarization images may be superimposed at the focal plane of the PI-LCMLA. So, the imaging quality in the polarization-independent mode may be improved significantly through effectively reducing the thickness of the double-sided ITO silica substrate.

The F-number of the lens (lens focal length divided by the diameter of the entrance pupil or effective aperture) may be used for evaluating lens system. Generally, the spatial resolution of an imaging system based on the PI-LCMLA is determined by the aperture and the definition of each LC micro-lens coupled to the sensor.

The imaging quality may be influenced by the selection of the F-number of the main lens system and LC micro-lens. There is a trade-off between the F-number of the top and the bottom LC micro-lens to increase the utilization rate of the photo-sensitive sensors. An optimum imaging process occurs when the adjacent imaging region of each LC micro-lens are tangential. In this disclosure, the F-number of the main lens system is adjusted to match that of the bottom LC micro-lens. Beams converged by the main lens system, propagate to shape a virtual image point, that is further converged by both LC micro-lenses. When the distance between the top and bottom LC cell is small enough, the F-number of the main lens system and the top and bottom LC cell will be approximately equivalent. Hence, the real image points of the top and bottom LC cell with central symmetry will be perfectly superimposed.

In one embodiment of the imaging system, the polarization-insensitive light field information will be degenerated by the difference of f-number caused by the cell gap between the top and bottom LC layers.

In summary, a PI-LCMLA based on a double-layered LC material with orthogonal alignment and dual-mode feature have been disclosed. The light utilization efficiency of the PI-LCMLA may be already improved corresponding to common LCMLAs driven electrically. The disclosed device may be applicable to polarization-insensitive applications and electrically selectable polarization applications. Based on the advantages of high light utilization efficiency, simple manufacturing flow, electrically tunable focal length, low power consumption, and dual-mode architecture, it may be expected that the PI-LCMLA device may play a role in future applications.

Figure 1:
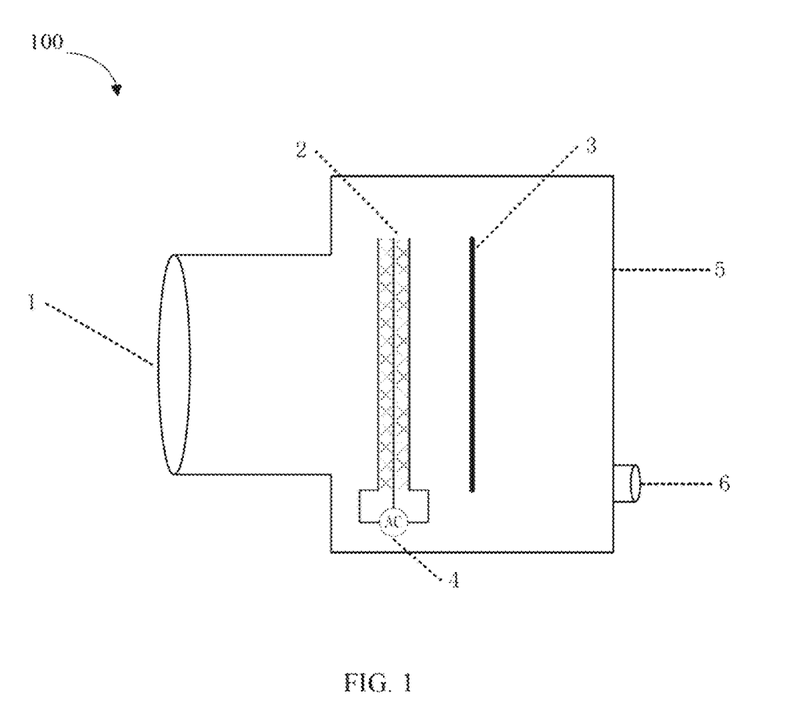
FIG. 1 illustrates a structural diagram of a light field camera based on an adjustable focal length and electrically polarization-independent liquid crystal micro-lens array in accordance with at least one embodiment of the disclosure.

FIG. 1 discloses the light field camera based on an adjustable focal length and electrically polarization-independent liquid crystal micro-lens array. The camera includes a camera shell (5), an image data interface on the camera (6), a main lens in front of the camera (1), an image sensor (3), the focal length between the image sensor and the main lens, an adjustable liquid crystal micro-lens array (2), and a power supply module of the liquid crystal micro-lens array (4). The liquid crystal micro-lens array can form a Gradient-index (GRIN) lens with power supply, and its focal length may be changed by adjusting the voltage. Different layers of the liquid crystal micro-lens array can be applied to corresponding e light based on anchoring direction of the liquid crystal layer' orientation layer. The incident light from a target object enters the camera, and is first converged by the main lens to form a real image or virtual image of the target object. The real image or virtual image is processed to secondary imaging through micro-lenses of the liquid crystal micro-lens array, and the imaging data is received and exported by the image sensor. The light field camera can perform three-dimensional imaging of the target object and obtain both perpendicular polarization-independent and insensitive polarization-independent light field information. Its imaging range has electrically adjustable feature.

Figure 2:
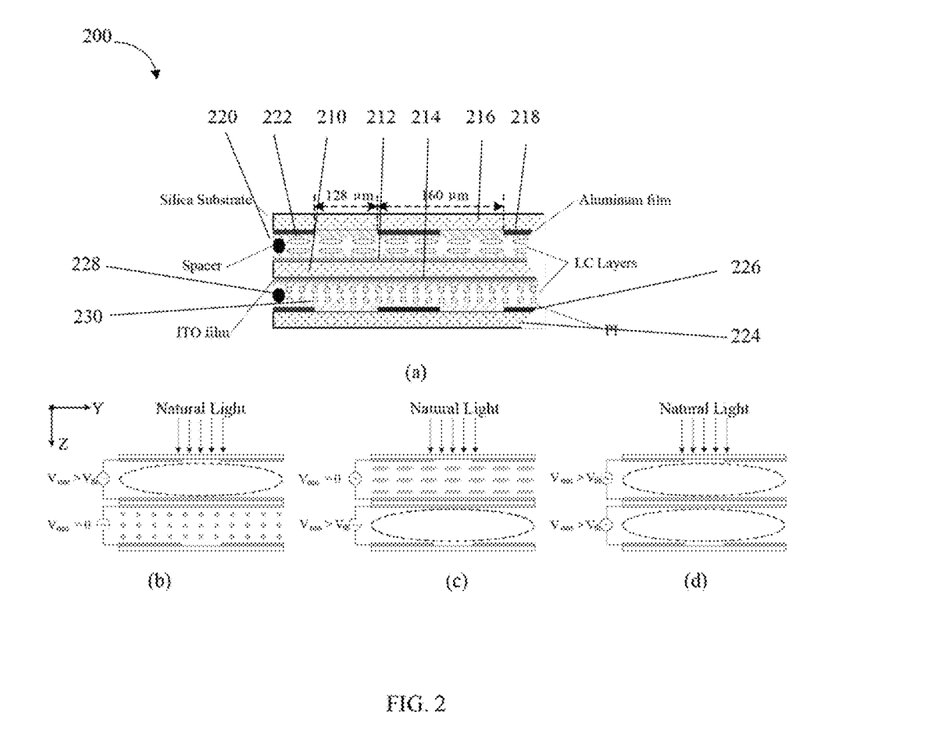
FIG. 2 illustrates a structural diagram of an adjustable focal length and electrically polarization-independent liquid crystal micro-lens array imaging detection chip in accordance with at least one embodiment of the disclosure.

FIG. 2 depicts one embodiment of the PI-LCMLA. The device is composed of two LC layers with orthogonal initially anchoring direction confined by the stacked LC cell. The surface of top and bottom substrates comprises an array of micro-holes coated with a layer of aluminum. The two hole-patterned aluminum substrates have a diameter of 128 um and a pixel-pitch of 160 um serves as a top pattern electrode and bottom pattern electrode, respectively. The medium silica coated with an indium tin oxide (ITO) film on both side is sandwiched between the two hole-patterned electrodes mentioned above to form the planar electrode. To achieve orthogonal homogeneous LC layers, the principal rubbing direction of polyimide alignment layers on both LC cell are arranged perpendicular to each other. The nematic liquid crystal may be a uniaxial birefringent crystal and have two principle refractive indices each having orthogonal rubbed micro-cavities.

FIG. 2 shows a structure diagram of the adjustable focal length and electrically polarization-independent liquid crystal micro-lens array imaging detection chip. The chip comprises of two layers of liquid crystal which are perpendicular to each other in two initializing directions. These two liquid crystal layers are served as top pattern electrode and bottom pattern electrode with two holes on each liquid crystal layer. A glass substrate coated with indium tin oxide (ITO) film on both sides, is sandwiched between these two liquid crystals. The liquid crystal micro-lens array can form a (GRIN) lens with power supply. Additionally, its focal length and polarization state may be adjusted by changing the loading voltage. The anchoring directions of different layers in the liquid crystal micro-lens array can be applied to the corresponding e light. When the driving voltage may be applied to the upper liquid crystal, the incident light from the target enters the chip. The vibration direction of the incident light electric field is parallel to the orientation direction of the top liquid crystal layer, and the top liquid crystal micro-lens array focuses the light to form a target image FIG. 2 (b). When the bottom liquid crystal is loaded with the driving voltage, the incident light which is perpendicular to the direction of the top liquid crystal is focused by the underlying liquid crystal layer (FIG. 2 (c). When both liquid crystal layers are simultaneously loaded with the driving voltage, the incident light in the direction of vibration of each electric field is focused by the imaging detection chip (FIG. 2 (d)).

Figure 3:
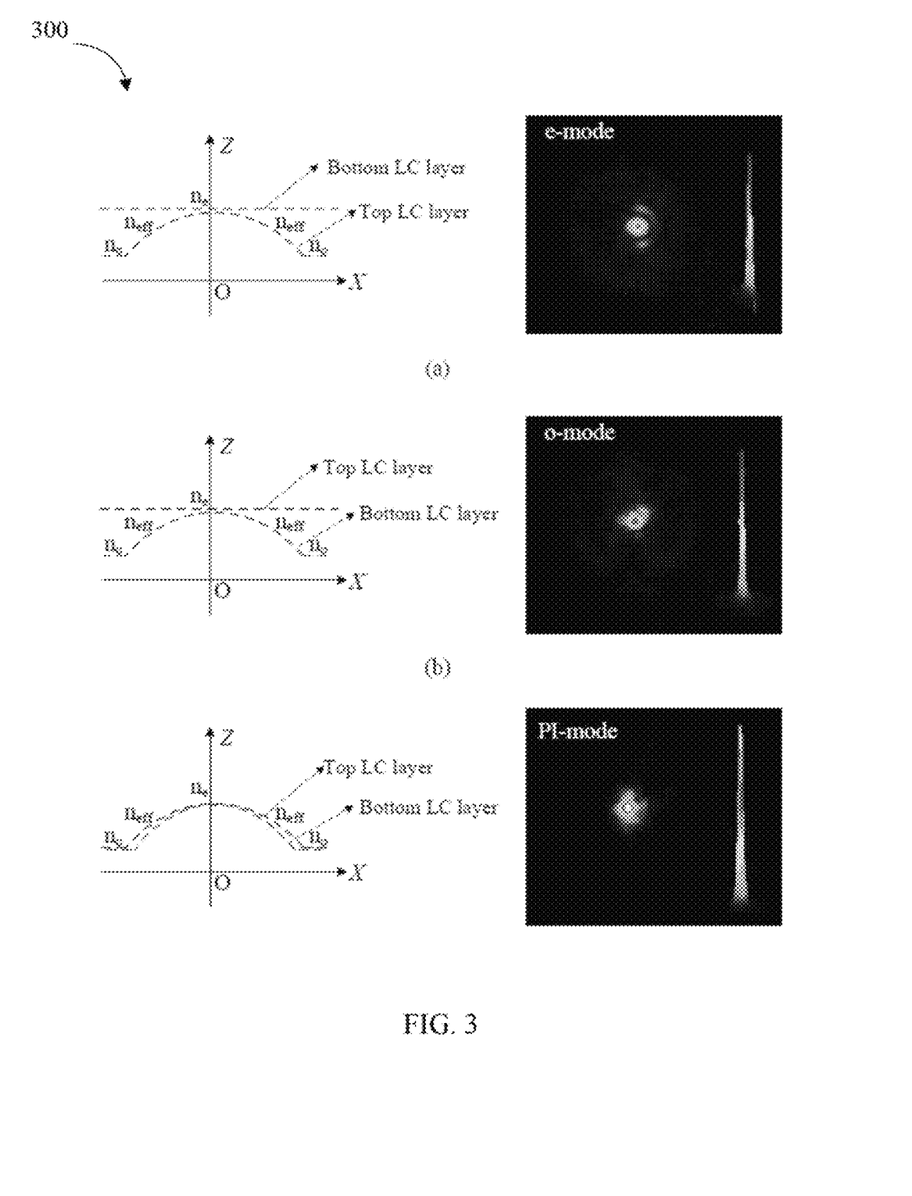
FIG. 3 illustrates the schematic of a polarization-independent liquid crystal micro-lens array in accordance with at least one embodiment of the disclosure with impinging white light and the extraordinary refractive distribution on various LC layers.

FIG. 2(a) illustrates one embodiment of a polarization-independent liquid crystal micro-lens array, that has an optically transparent, dielectric planar panel 210 having a top surface and a bottom surface, an optically transparent upper planar electrode 212 deposited upon the planar panel top surface and an optically transparent lower planar electrode 214 deposited upon the planar panel bottom surface. A top substrate 216 has an external surface and an internal surface, and the top substrate is positioned adjacent to and aligned with the planar panel top surface. A top pattern electrode 218 is deposited on the top substrate internal surface and is patterned with an array of micro-holes. A top spacer 220 is positioned between the planar panel top surface and the top substrate internal surface. A top liquid crystal layer 222 is held between the planar panel top surface and the top substrate internal surface, the top liquid crystal layer has a first polarization. A bottom substrate 224 has an external surface and an internal surface and is positioned adjacent to the planar panel bottom surface. A bottom pattern electrode 226 is deposited on the bottom substrate internal surface and is patterned with another array of micro-holes. A bottom spacer 228 separates the planar panel bottom surface and the bottom substrate internal surface. A bottom liquid crystal layer 230 is held between the planar panel bottom surface and the bottom substrate internal surface and has a second polarization orthogonal to the first polarization Unpolarized white light is transmitted through the coupled LC layers of PI-LCMLA. The intensity distribution of incident beams received by the focal plane of CCD camera is dependent on the polarized direction of light and is determined by the LC molecules' orientation, which in turn, is controlled through the driving voltage modes applied on the PI-LCMLA. Light which may be decomposed into two principle linearly polarized components with orthogonally vibrating direction is modulated by the sample. FIG. 2 illustrates the schematic of sample interacting with unpolarized light under different working modes. From the structure of PI-LCMLA shown in FIG. 2(a), the external voltage applied on the LC cell will be affected by the micro-hole pattern electrode. The electric field intensity decreases from the edge of micro-hole electrode to the central region of micro-hole. LC molecules tend to reorient along with the direction of driving voltage, a gradient refractive index distribution will be formed by the nonuniform electric field shaped by the micro-hole pattern electrode. If no voltage is applied on the LC cell, the refractive index of light stays constant. As the driving voltage applied on the one LC cell, this LC layer forms the lens effect and the other one is a phase retarder. As the sample working in the e-mode (FIG. 2(b)), the horizontally polarized light is converged by the top LC layer and the residual light distribute around the focusing spot. Similarly, as the sample working in the o-mode (FIG. 2(c)), the vertically polarized light is focused by the bottom LC layer and the horizontal polarized beams pass through the device without converging. From FIG. 2(d), the incident beams are focused by the sample in the polarization-insensitive (PI) mode. The refractive index distribution of a micro-hole pattern on each cell is depicted on the left side of FIG. 3. The focusing pattern is shown in the right side of FIG. 3.

Figure 4:
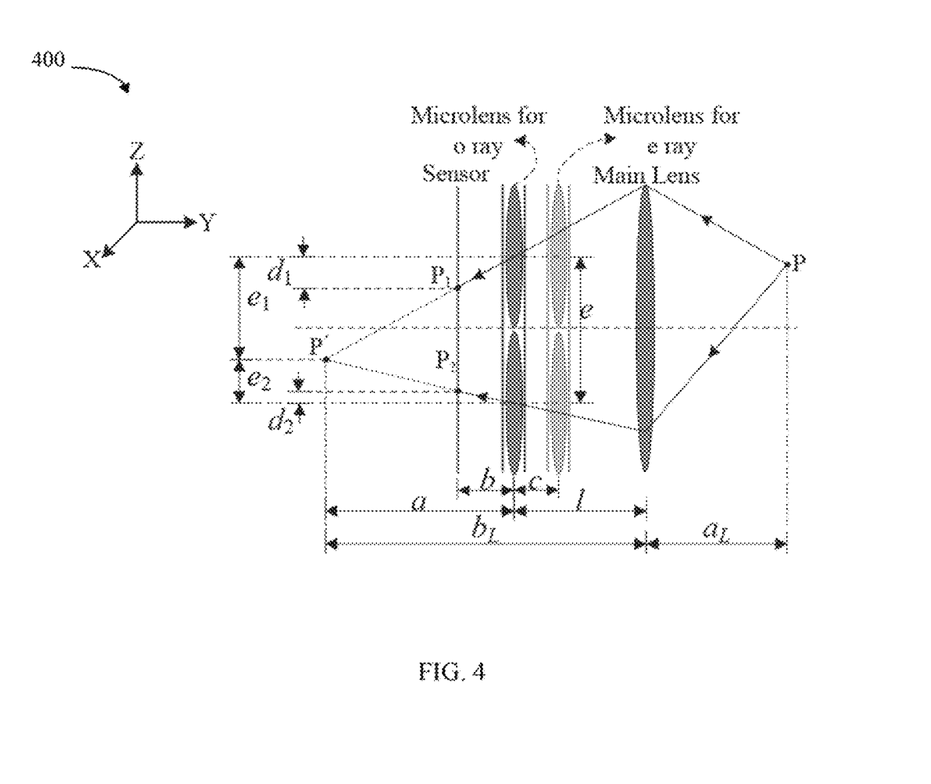
FIG. 4 illustrates the schematic of an imaging system based on an adjustable focal length and electrically polarization-independent liquid crystal micro-lens array in accordance with at least one embodiment of the disclosure.

A schematic of an embodiment of the PI-LCMLA imaging system, which has a main lens system, PI-LCMLA and an image-sensor, is shown in FIG. 4. The imaging process follows the Galilean model. In this model, the virtual image generated by the main lens is behind the PI-LCMLA and imaging sensor. Then, the micro-images formed by the PILCMLA, which has the light field information, are remapped onto the focal plane of CCD camera. According to the architecture, this imaging system consists of three subsystems that lead to multiple imaging modes, such as polarization and polarization-insensitive mode. So, when the imaging system works in the polarization mode (o-mode, e-mode), two orthogonally polarized images, which contain the light field information, may be acquired by PI-LCMLA.

In this disclosure, the pinhole model may be used to estimate the depth information of object. As shown in FIG. 4, the virtual point P' created by the main lens is located behind the imaging sensor. The rays from the object point P between the main lens and two adjacent LC micro-lenses on the bottom LC layer are refocused onto points P1 and P2 of focal plane of imaging sensor that is the image plane of PI-LCMLA. Similarly, the image points formed by the top LC layer may also be remapped on the image sensor. If the gap between top and bottom LC layer is thin enough, the image points acquire by the different layer may be superimposed.

In this disclosure, an imaging system based on an electrically tunable polarization-independent liquid crystal micro-lens array is depicted. Using the PI-LCMLA with two orthogonal LC layers, the optically imaging system integrated with the PI-LCMLA may work in multiple modes by tuning the voltage set, which enables the acquisition of the light filed information of targets at different depth and different polarization states.

Figure 5:
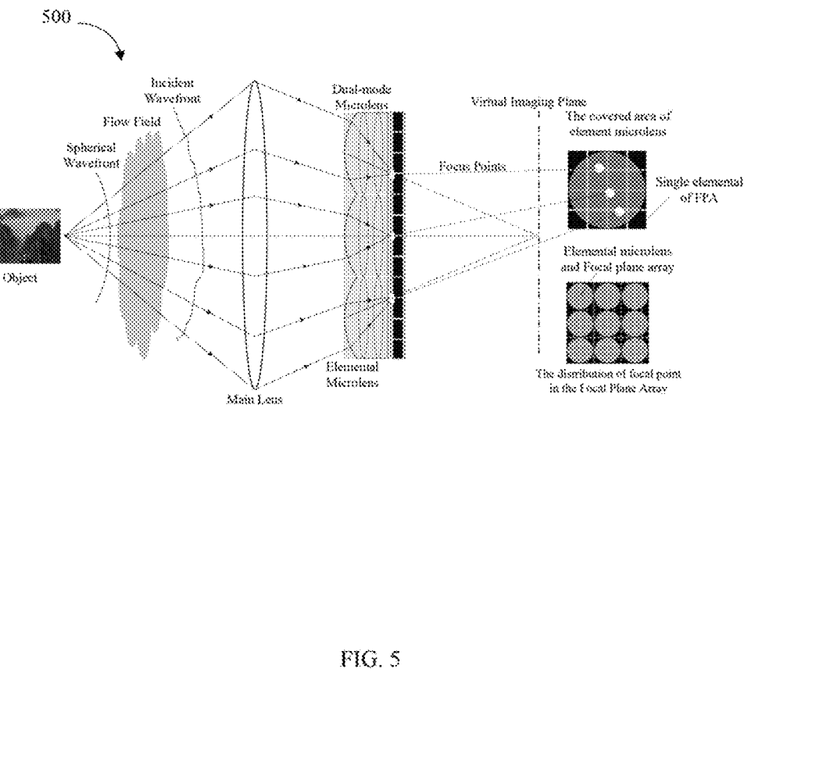
FIG. 5 illustrates a principle diagram of the adjustable focal length and electrically polarization-independent liquid crystal micro-lens array imaging detection chip.

As shown in FIG. 5, the liquid crystal micro-lens array imaging detection chip is integrated with the focal plane of the main imaging detector to form an optical field imaging detection architecture with adjustable polarization state in the chip. Below is the combination of the micro-lens device and the imaging detector focal: Under the set array scale or spatial resolution mode, each unit of refraction micro-lens is matched with a multivariate detector, such as 2×2, 4×4, 8×8, or even matched with an array of larger sub-detector array (matching coupling). For a single refraction micro-lens, an infrared incident wave is discretized and formed a sub-plane wavefront with different inclinations. The sub-plane wavefront is focused by the micro-lens on a specific photosensitive unit in the corresponding sub-detector array. The focus spot is converted by an infrared detector placed in the photosensitive unit and turned into a photoelectric responsive signal.

It is to be understood that various modifications may be made without departing from the spirit and scope of the invention. It is to be understood that the foregoing description is intended to illustrate and not to limit the scope of the invention, which is defined by the scope of the following claims, and that other embodiments are within the scope of the claims.

What is claimed is:

1. A polarization-independent liquid crystal micro-lens array, comprising:
    an optically transparent, dielectric planar panel, the planar panel having a top surface and a bottom surface;
    an optically transparent upper planar electrode deposited upon the planar panel top surface;
    an optically transparent lower planar electrode deposited upon the planar panel bottom surface;
    a top substrate having a top substrate external surface and a top substrate internal surface, the top substrate positioned adjacent to the planar panel top surface;
    a top pattern electrode deposited on the top substrate internal surface, wherein the top pattern electrode is patterned with an array of micro-holes;
    a top spacer disposed between the planar panel top surface and the top substrate internal surface;
    a top liquid crystal layer disposed between the planar panel top surface and the top substrate internal surface, the top liquid crystal layer having a first polarization;
    a bottom substrate having a bottom substrate external surface and a bottom substrate internal surface, the bottom substrate positioned adjacent to the planar panel bottom surface;
    a bottom pattern electrode deposited on the bottom substrate internal surface, wherein the bottom pattern electrode is patterned with another array of micro-holes;
    a bottom spacer disposed between the planar panel bottom surface and the bottom substrate internal surface; and
    a bottom liquid crystal layer disposed between the planar panel bottom surface and the bottom substrate internal surface, the bottom liquid crystal layer having a second polarization orthogonal to the first polarization.

2. The polarization-independent liquid crystal micro-lens array of claim 1 wherein the top substrate is silica.

3. The polarization-independent liquid crystal micro-lens array of claim 1 wherein the bottom substrate is silica.

4. The polarization-independent liquid crystal micro-lens array of claim 1 wherein the top pattern electrode may be aluminum.

5. The polarization-independent liquid crystal micro-lens array of claim 1 wherein the bottom pattern electrode may be aluminum.

6. The polarization-independent liquid crystal micro-lens array of claim 1 wherein the upper planar electrode is indium tin oxide.

7. The polarization-independent liquid crystal micro-lens array of claim 1 wherein the lower planar electrode is indium tin oxide.

8. The polarization-independent liquid crystal micro-lens array of claim 1 further comprising a micro-lens connected to the top substrate external surface.

9. The polarization-independent liquid crystal micro-lens array of claim 1 further comprising an image sensor positioned adjacent to the bottom substrate external surface.

10. The polarization-independent liquid crystal micro-lens array of claim 1 wherein the top pattern electrode is patterned having a micro-hole diameter of 128 microns and a pixel-pitch of 160 microns.

11. The polarization-independent liquid crystal micro-lens array of claim 10 wherein the bottom pattern electrode matches the top pattern electrode.

12. A polarization-independent liquid crystal micro-lens array optical system, comprising:
    a liquid crystal micro-lens, having;
    an optically transparent, dielectric planar panel, the planar panel having a top surface and a bottom surface;
    an optically transparent upper planar electrode deposited upon the planar panel top surface;
    an optically transparent lower planar electrode deposited upon the planar panel bottom surface;
    a top substrate having a top substrate external surface and a top substrate internal surface, the top substrate positioned adjacent to the planar panel top surface;
    a top pattern electrode deposited on the top substrate internal surface, wherein the top pattern electrode is patterned with an array of micro-holes;
    a top spacer disposed between the planar panel top surface and the top substrate internal surface;
    a top liquid crystal layer disposed between the planar panel top surface and the top substrate internal surface, the top liquid crystal layer having a first polarization;
    a bottom substrate having a bottom substrate external surface and a bottom substrate internal surface, the bottom substrate positioned adjacent to the planar panel bottom surface;
    a bottom pattern electrode deposited on the bottom substrate internal surface, wherein the top pattern electrode is patterned with another array of micro-holes;
    a bottom spacer disposed between the planar panel bottom surface and the bottom substrate internal surface;
    a bottom liquid crystal layer disposed between the planar panel bottom surface and the bottom substrate internal surface, the bottom liquid crystal layer having a second polarization orthogonal to the first polarization;

a top voltage driver electrically connected to the upper planar electrode and the top pattern electrode; and a bottom voltage driver electrically connected to the lower planar electrode and the bottom pattern electrode, wherein the bottom voltage driver and top voltage driver are simultaneously actuated to permit transit of unpolarized light through the liquid crystal micro-lens.

13. The polarization-independent liquid crystal microlens array optical system of claim 12 further comprising a micro-lens connected to the top substrate external surface.

14. The polarization-independent liquid crystal microlens array optical system of claim 13 further comprising an image sensor positioned adjacent to the bottom substrate external surface.

15. The polarization-independent liquid crystal microlens array optical system of claim 14 further comprising a main lens positioned adjacent to the micro-lens.

16. The polarization-independent liquid crystal microlens array optical system of claim 15 further comprising a housing enclosing the main lens, the micro-lens, the liquid crystal micro-lens and the image sensor.

17. The polarization-independent liquid crystal microlens array optical system of claim 12 wherein the top substrate and the bottom substrate are silica.

18. The polarization-independent liquid crystal microlens array optical system of claim 12 wherein the top pattern electrode and the bottom pattern electrode are aluminum with a pattern having a micro-hole diameter of 128 microns and a pixel-pitch of 160 microns.

19. The polarization-independent liquid crystal microlens array optical system of claim 12 wherein the upper planar electrode and the bottom electrode are indium tin oxide.

20. The polarization-independent liquid crystal microlens array optical system of claim 12 wherein the top pattern electrode and the bottom pattern electrode patterns are vertically aligned.

* * * * *